July 18, 1944.  H. A. STORCH  2,353,945

VIBRATION DAMPENER

Filed Feb. 8, 1943

INVENTOR.
HAROLD A. STORCH
BY Kwis Hudson & Kent
ATTORNEYS

Patented July 18, 1944

2,353,945

UNITED STATES PATENT OFFICE 2,353,945

VIBRATION DAMPENER

Harold A. Storch, Fairview Village, Ohio, assignor to Harris Products Company, Cleveland, Ohio, a corporation of Ohio Application February 8, 1943, Serial No. 475,065

3 Claims. (Cl. 248—358)

This invention relates to vibration dampeners for mounting instruments and various other uses and aims to provide an improved device of this kind which, although rugged and durable in form, is nevertheless very efficient in use.

Another object of the invention is to provide an improved vibration dampener which is so designed that the parts can be produced very rapidly and economically and can be easily and quickly assembled.

Other objects and advantages of the invention will be apparent from the following description when taken in conjunction with the accompanying sheet of drawings in which Fig. 1 is a plan view of a vibration dampener constructed according to my invention.

Figure 1:
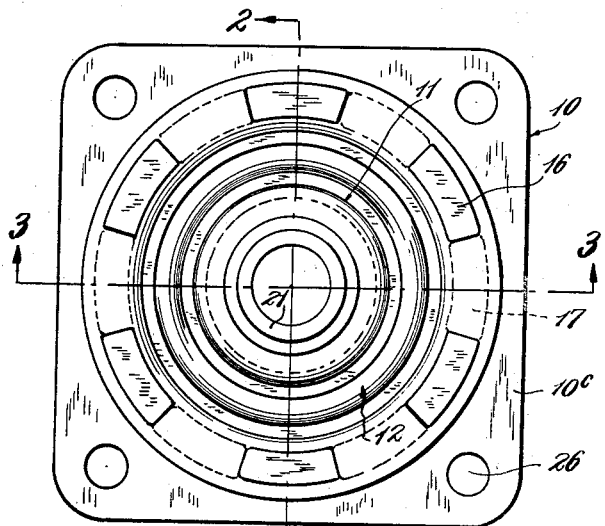
Figure 2:
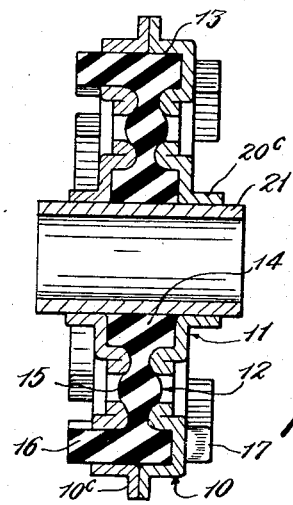
Fig. 2 is a transverse sectional view taken through the device on line 2—2 of Fig. 1.
Figure 3:
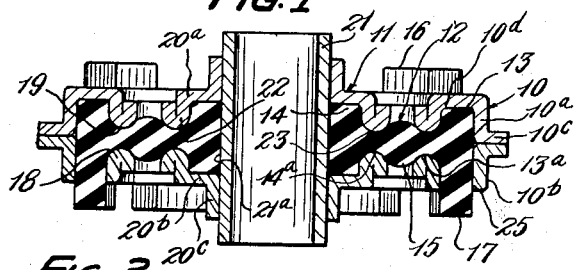
Fig. 3 is a similar sectional view taken through the device as indicated by line 3—3 of Fig. 1.

Proceeding with a more detailed description of my vibration dampener, I show this device in Figs. 1, 2 and 3 as comprising outer and inner members 10 and 11 adapted to be connected respectively with a support and an instrument or the like to be supported, and an intermediate or connecting member 12 forming a flexible connection between the members 10 and 11.

The intermediate member 12 is in the form of a resilient ring which forms the sole connection between the outer and inner members 10 and 11 and permits both a relative axial movement and a substantially universal relative rocking or tilting movement between these members. The resilient nature of the intermediate member 12 enables the same to serve as a shock absorbing and vibration dampening medium. The member 12 is preferably molded or otherwise formed of soft rubber, which may be either a natural or synthetic rubber, or may be formed of any other suitable material having rubber-like characteristics.

As shown in the drawing the intermediate member 12 is constructed with relatively thickened annular rim portions 13 and 14 extending around its outer and inner peripheries and is also provided with a web portion 15 forming a continuous annular integral connection between the outer and inner peripheral rim portions 13 and 14. Adjacent the junction of the rim portions 13 and 14 with the web portion 15 I provide the latter with transversely curved annular grooves 13a and 14a.

Figure 5:
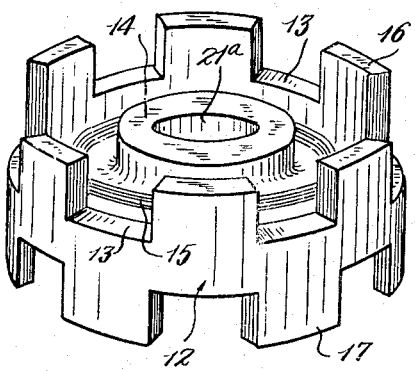
Fig. 5 is a perspective view showing the resilient intermediate or connecting member in detached relation.

In accordance with an important feature of the invention to be further described hereinafter, I provide the intermediate member 12 with axial projections or bumper elements 16 and 17. These bumper elements comprise resilient tooth-like projections which are formed integral with the thickened outer peripheral rim portion 13. As best shown in Fig. 5 these bumper elements are arranged in two groups, comprising respectively the elements 16 and 17, with the elements 16 disposed in staggered relation to the element 17.

The outer member 10 comprises a pair of complemental parts 10a and 10b which may be in the form of sheet metal stampings. The parts 10a and 10b each have a flange or rim portion 10c of substantially quadrangular shape and also have an annularly grooved portion or section 10d. When the parts 10a and 10b are assembled in face-to-face complemental relation, as shown in Figs. 2 and 3, the grooved portions 10d thereof form a hollow annular ring portion in which the thickened outer rim portion 13 of the intermediate member 12 is gripped or confined. The parts 10a and 10b can be held in the assembled complemental relation shown in the drawing by welding, riveting, or otherwise connecting together the flange portions 10c of these parts. The parts 10a and 10b are preferably also provided around their inner edges with integral annular beads 18 which engage in the annular grooves 13a of the intermediate member 12. These annular beads may be of rounded form to fit snugly in the grooves 13a so as to decrease the likelihood of the intermediate member becoming cut or torn at this point. The annular beads 18 are of a length such that when the parts 10a and 10b are connected together in face-to-face relation an annular slot or opening 19 is left to accommodate the web portion 15 of the member 12.

The inner member 11 comprises a pair of complemental cupped or grooved parts 20a and 20b, and a tube or sleeve 21 on which such parts are mounted and which extends through the central opening 21a of the member 12. The parts 20a and 20b may be formed as sheet metal stampings having axially extending flange or sleeve portions 20c by which they are mounted on the tube 21. The flange portions 20c may have a press fit on the tube 21 or may be connected therewith by welding, brazing or the like. When the parts 20a and 20b are assembled as shown in the drawing they cooperate with the tube 21 to form a hollow annular ring portion in which the thickened inner rim portion 14 of the intermediate member 12 is gripped or confined. The parts 20a and 20b are provided around their outer edge with rounded beads 22 similar to the above mentioned beads 18 and which engage in the annular grooves 14a of the intermediate member. The beads 22 are of a length such that an annular slot or opening 23 is left therebetween to accommodate the web portion 15 of the intermediate member 12.

In the completed vibration dampener the outer member 10 is substantially concentric with the inner member 11 and surrounds the latter with an annular space therebetween which is spanned by the web portion 15 of the intermediate member 12. Most of the flexing to which the intermediate member 12 is subjected by shocks, vibrations or other relative movements between the outer and inner members 10 and 11 occurs in the web portion 15. In forming the parts 10a and 10b of the outer member 10 a plurality of annularly spaced slots 25 are provided in the grooved portions 10d of a size, shape and number to correspond with the bumper projections 16 and 17 of the intermediate member 12. In the completed device the bumper projections 16 and 17 extend through the slots 25 and, in addition to serving as bumper elements, they assist in locking the thickened rim portion 13 in the outer member 10 and also prevent relative creeping or shifting of such rim portion in the outer member.

When my vibration dampener is used for mounting an instrument or the like one of the paired members of the device, such as the outer member 10, is connected with the bulkhead or other support by means of screws or rivets extending through the openings 26 of this member, and the instrument to be supported is connected with the other member, that is, with the inner member 11 by means of a bolt or the like extending through the tube 21. During the use of the device the axially extending projections 16 and 17 form bumper elements which will be engaged by adjacent structure and will limit and cushion excessive relative axial movements as well as excessive relative tilting or angular movements.

Figure 4:
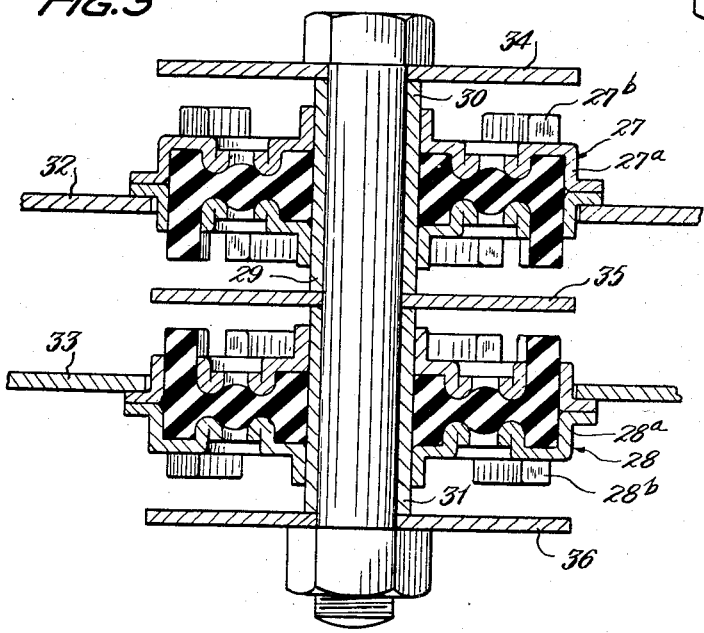
Fig. 4 is a sectional view taken through an assembly using two of my improved vibration dampeners.

My improved vibration dampener can be used either singly or in multiple for mounting purposes. When a multiple arrangement is used a more flexible mounting is obtained which is capable of increased relative axial and tilting movements. In Fig. 4 of the drawing I show such a multiple use of my vibration dampener in which two individual dampeners 27 and 28, of the above described construction, are connected by a bolt 29 extending through the axially aligned tubes 30 and 31 of these devices. In such a multiple arrangement one of the dampeners, for example the dampener 27, has its outer member 27a connected with an available support 32 and the instrument panel or the like 33 to be supported is connected with the outer member 28a of the other dampener. Stop plates 34, 35 and 36 are also provided on the clamping bolt 29 to lie above, between, and below the individual dampeners. These stop plates may be in the form of substantially rigid disks of a size to extend in overlapping relation to the outer members 27a and 28a so that they will be engaged by the axially projecting bumper elements 27b and 28b upon the occurrence of excessive relative axial or relative tilting movements.

It will be understood of course that when the dampeners are used singly in forming a flexible mounting a pair of stop plates, such as the plates 34 and 35, are usually clamped in engagement with the ends of the tube 21.

From the foregoing description and the accompanying drawing it will now be readily understood that I have provided an improved vibration dampener which, although of simple and economical construction, is very strong and durable and provides an efficient and satisfactory means for mounting instruments on airplanes, and for various other purposes, where it is desirable that the mounting means be capable of absorbing shocks and vibrations which might be damaging to the instrument or other body being supported. It will also be seen that in my improved vibration damper excessive relative axial movements, and excessive relative tilting or angular movements in all directions, will be limited and cushioned by the cooperating stop and bumper elements provided in the device.

While I have illustrated and described my improved vibration dampener in considerable detail, it will be understood of course that I do not wish to be correspondingly limited but regard my invention as including such changes and modifications as come within the scope of the appended claims and do not constitute a departure from the spirit of my invention.

Having thus described my invention, I claim:

1. A device of the character described, comprising a resilient ring having thickened rim portions around its inner and outer peripheries, and a pair of members engaging said thickened rim portions so as to be flexibly connected by said resilient ring, the thickened outer rim portion of said ring having annularly spaced projections extending axially of the ring in opposite directions and the rim-engaging portions of said outer member having corresponding annularly spaced openings through which said projections extend.

2. A device of the character described, comprising a resilient ring having thickened rim portions around its inner and outer peripheries, and a pair of members having confining engagement with said thickened rim portions and being flexibly connected by said resilient ring, the thickened outer rim portion of said ring having groups of annularly spaced projections extending axially of the ring in opposite directions with the projections of one group staggered relative to the projections of the other group and the rim-engaging portions of said outer member having corresponding groups of staggered openings through which said projections extend.

3. A device of the character described, comprising a resilient ring having thickened rim portions around its inner and outer peripheries, a pair of inner and outer substantially concentric members having confining engagement with said thickened rim portions and being flexibly connected by said resilient ring, and stop means connected with said inner member and extending laterally in overlapping relation to and on opposite sides of the outer member, said outer rim portion of said ring having bumper projections extending axially in opposite directions and engageable with said stop means.

HAROLD A. STORCH.